Figure 1:
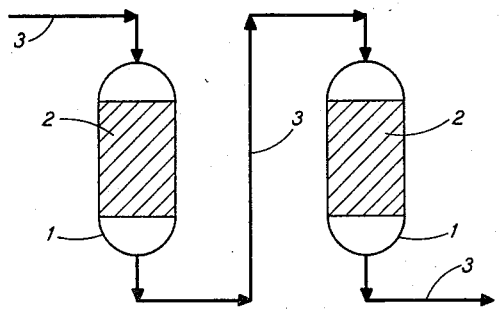

Sept. 30, 1958 E. C. DEFOE 2,854,406
CONTINUOUS HYDROCARBON OIL TREATING AND FILTER REGENERATION
Filed Feb. 17, 1956 3 Sheets-Sheet 1

INVENTOR
EDWARD C. DEFOE
BY
ATTORNEYS

Sept. 30, 1958 E. C. DEFOE 2,854,406
CONTINUOUS HYDROCARBON OIL TREATING AND FILTER REGENERATION
Filed Feb. 17, 1956 3 Sheets-Sheet 2

INVENTOR
EDWARD C. DEFOE
BY
ATTORNEYS

Sept. 30, 1958 E. C. DEFOE 2,854,406
CONTINUOUS HYDROCARBON OIL TREATING AND FILTER REGENERATION
Filed Feb. 17, 1956 3 Sheets-Sheet 3

INVENTOR
EDWARD C. DEFOE
BY
ATTORNEYS

United States Patent Office 2,854,406
Patented Sept. 30, 1958

2,854,406

CONTINUOUS HYDROCARBON OIL TREATING AND FILTER REGENERATION

Edward C. Defoe, Richmond, Calif., assignor, by mesne assignments, to California Research Corporation, San Francisco, Calif., a corporation of Delaware Application February 17, 1956, Serial No. 566,214

3 Claims. (Cl. 208—305)

The present invention relates to the regeneration of spent adsorbents employed in the percolation filtration of hydrocarbon oils, and it is an object of the invention to provide a novel method for reducing the impurity content of such adsorbents prior to the regeneration thereof by burning whereby the regeneration may be effected at a lower temperature than would otherwise be necessary.

The granular adsorbents with which this invention is concerned include all those various fuller's earths, clays, and other mineral adsorbents amenable to revivification or reactivation by heat treating or "burning" at elevated temperatures following their use in treating hydrocarbon oils. All such adsorbents are intended to be included by the term "adsorbent" or "clay adsorbent," as employed herein. Adsorbent materials may be applied to oils by at least three distinct methods: (1) Percolating the oils through filter beds of granular adsorbent material (percolation filtration), (2) mixing the oils with adsorbents of much finer mesh than the percolation adsorbents, then separating the adsorbents from the oils by filtering (contact filtration), and (3) passing the oil vapors through a column of granular adsorbent material (vapor phase refining). This invention is not concerned with contact filtration since no regeneration step is there employed. On the other hand, it is concerned with percolation filtration and vapor phase refining, including pre-regeneration treating and regeneration of the granular adsorbents used. Although the invention is applicable to vapor phase refining, the following discussion will be limited to percolation filtration, a discussion of which will be adequate to explain the invention and to indicate the applicability of the invention to vapor phase refining.

Percolation filtration is commonly used commercially for the purpose of treating lubricating oils and lighter petroleum fractions of low asphalt content for various purposes, including decolorization, neutralization, removal of suspended, colloidal and dissolved impurities such as carbon, coke, oxygen and nitrogen-containing impurities, and improvement of oil demulsibility properties. In the fixed bed percolation process oil is percolated downwardly through a fixed column of granular adsorbent, for example fuller's earth. After the oil percolation has continued until adsorption by, or deposition on, the adsorbent material of contaminants from the oil has reduced the effectiveness of the adsorbent to a minimum permissible effectiveness, the adsorbent material is considered "spent," and must be regenerated if it is to be further used.

Under the conventional practice, regeneration is effected by allowing the adsorbent to drain of free oil, after which it is further treated to remove the oil present therein before being burned. This further treatment to remove oil generally comprises a combination of solvent washing and steam treating steps, the removal of oil normally being indicated by the disappearance of (oil) color from the naphtha wash stream.

The process of regeneration by burning comprises subjecting the washed and steamed adsorbent to elevated temperatures in a burning zone, for example, a rotary kiln, multiple-hearth type furnace, or a "Thermofor" kiln, discussed hereinafter, such burning or "roasting" being the only practicable method for regenerating the clay. Its purpose is to (1) evaporate from the clay "free moisture," i. e., moisture that has been adsorbed by the clay without affecting the clay structure, (2) evaporate from the clay limited quantities of "combined moisture," i. e., moisture that bears an intimate relationship to the internal structure of the clay, and (3) partially oxidize certain adsorbed organic matter remaining on the clay particles. The "free moisture" is easily evaporated at low temperatures close to the boiling point of water. The "combined moisture" is released from the clay only at elevated temperatures, and, while it is desirable that the total clay moisture be reduced to a low level, sustained elevated temperatures that will effect the total removal of "combined moisture" cannot be tolerated because such total removal permanently changes the structural characteristics of the clay in a manner that permanently injures its adsorptive characteristics. Unfortunately, however, clay adsorbents which have been deoiled by conventional washing and steaming procedures require the use of these dangerously elevated temperatures if effective adsorptive capacity is to be regained, thus requiring the use of complex temperature control equipment, and resulting in appreciable loss in clay adsorption capacity. It would therefore be desirable if a method were available whereby regeneration could be effected at lower temperatures. The provision of such a method is an object of this invention. Attempts have been made to reduce the temperatures necessary to oxidize the adsorbed organic and other deposits on the clay by various means, including the addition to the clays of various catalysts, but thus far the attempts have fallen far short of practical success. Certain catalysts have been found that may permit a somewhat lower burning temperature, but they have been found to have the concomitant disadvantage of impairing the decolorizing power of the clay.

It has been found that clay treated by conventional methods prior to burning retains a very substantial content of adsorbed hydrocarbons and other impurities even after the solvent wash streams are substantially full of these materials. It has been further found that a further reduction in the amounts of these residual materials present with the clay will permit lower burning regeneration temperatures. In addition, a further reduction in these materials will reduce the tendency of the clay to be subjected to uncontrolled burning in localized areas of high oil content. Such uncontrolled burning destroys the clay structure by removing "combined moisture," or water of hydration, and by reducing the active surface area of the clay. Further, it has been found that such further reduction will tend to eliminate the usual very odoriferous oil plume that emanates from the kiln or furnace stack when higher hydrocarbon content clays are burned at conventional temperatures. The objectionable odor of the usual plume has been found to be directly attributable to the excessive oil content of the clay which when burned releases distilled and partially burned hydrocarbons. From the foregoing, it may be seen that the residual high oil and other impurity content of clays that have been treated by conventional method prior to burning causes very serious problems and necessitates elevated regeneration temperatures that in turn cause further serious problems. In view of the foregoing, it is an object of this invention to provide methods which will enable adsorbent clays to be regenerated at temperatures sufficiently lower than those possible with conventional methods that clay structure and efficiency remain substantially less impaired than with prior art methods. It is also an object of this invention to provide methods which will enable clay regeneration by burning to be accomplished without an objectionably odoriferous oil plume emanating from the regeneration equipment.

In accordance with the present invention improvements in adsorption separation processes are provided by treating "spent" granular adsorbent clay with applications of steam, in appreciably greater amounts and for appreciably greater periods of time than in conventional treating practices to the extent that, in addition to the conventional prior art function of the steam in removing the naphtha from the clay, the steam is caused to perform a second and novel function, that of desorbing from the clay strongly held resins and such materials as sulfates and sulfonates. The steam applications are preferably used in conjunction with naphtha applications in which case it is desirable to alternate the applications of naphtha and steam. Treatment of clay in accordance with the methods of the present invention reduces the residual oil and tar content of the washed and steamed clay prior to its regeneration to a much lower value than with conventional methods, as is evidenced by the high steam condensate content of the treated clay resulting from a replacement of the hydrocarbons and other impurities by the steam condensate. Further in accordance with this invention, the treated clay is burned at substantially lower regeneration temperatures than conventional regeneration temperatures.

Figure 2:
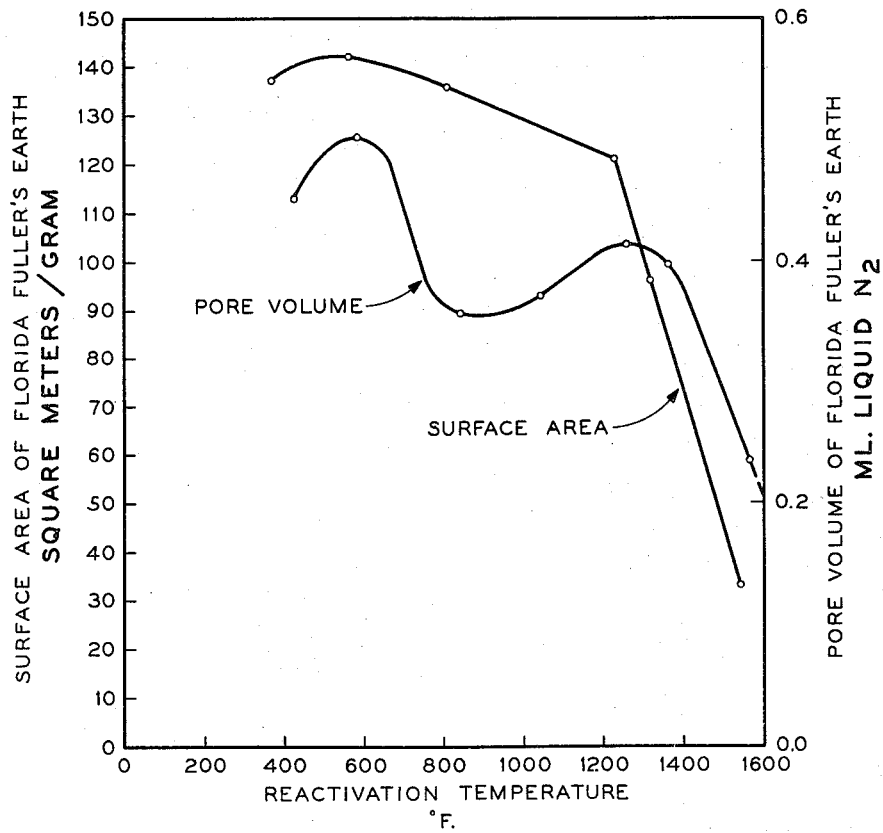
Figure 3:
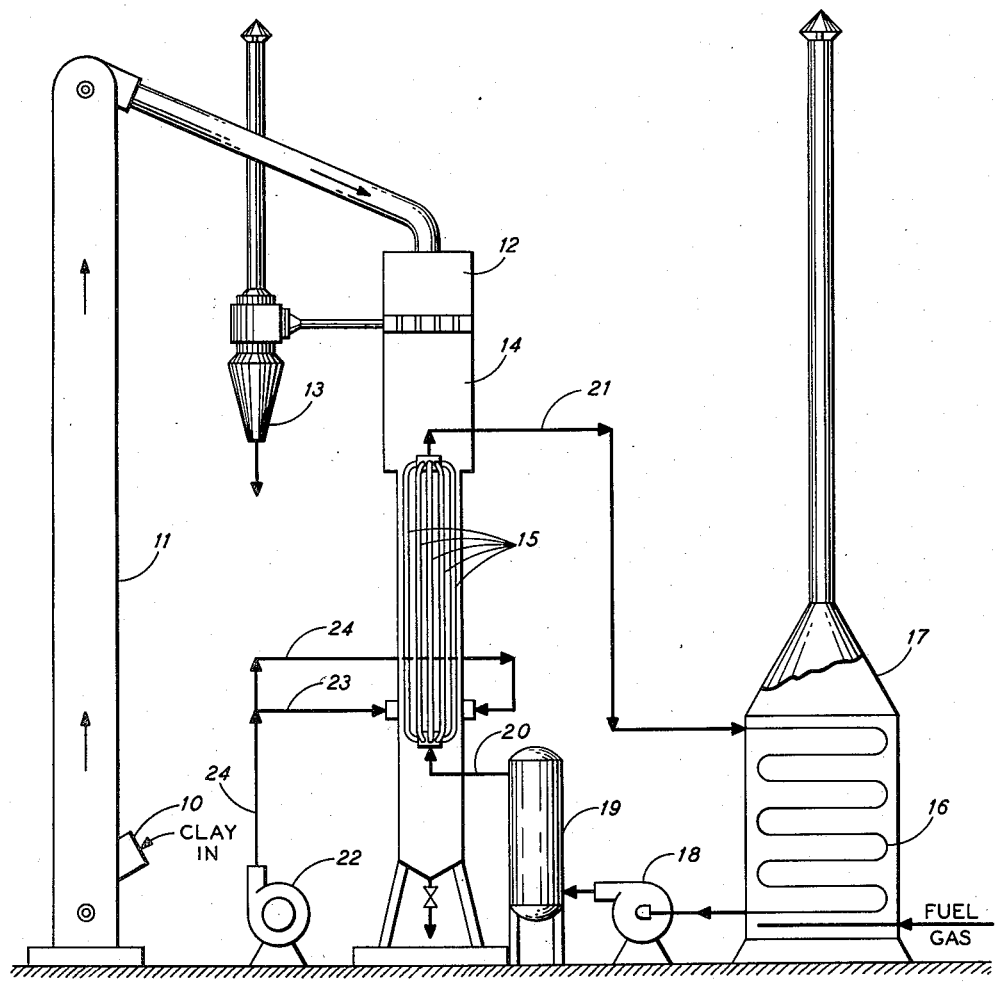
Figure 4:
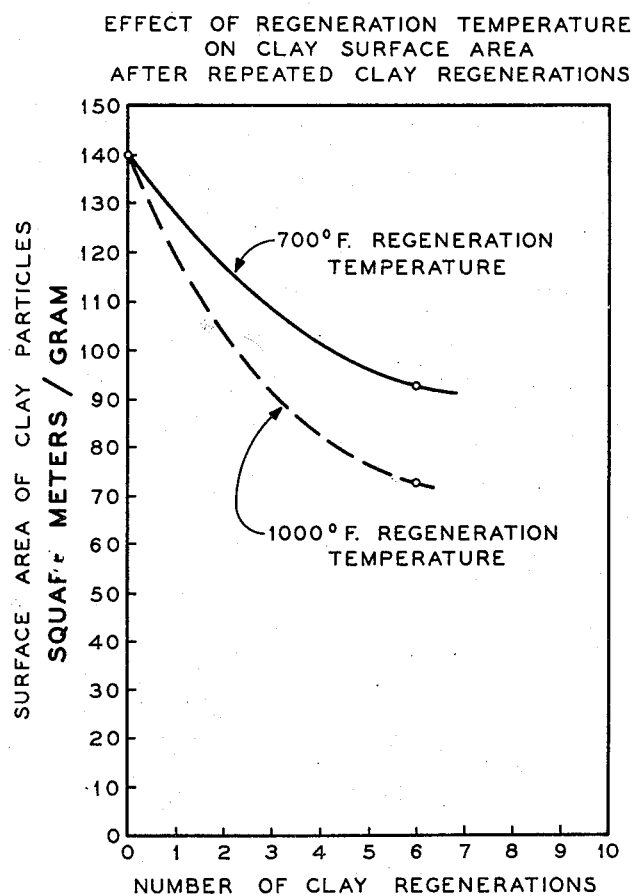

The novel features of the present invention are set forth with particularity in the appended claims. The invention will best be understood, however, both as to details and application, and additional objects and advantages thereof will be apparent from the following description of a specific application, when read in connection with the accompanying drawings, in which:

Fig. 1 is a sectional elevation view of a lubricating oil filter containing particulate adsorbent material; and Fig. 2 is a graph indicating the relationship between (a) clay surface area and reactivation temperatures for Florida fuller's earth; and (b) clay pore volume and reactivation temperatures for Florida fuller's earth; and Fig. 3 is a sectional elevation view of a "Thermofor" kiln and associated equipment; and Fig. 4 is a graph indicating the effect of various clay regenerating temperatures or clay surface area after repeated clay regenerations.

A preferred mode of practicing the clay washing steps of the present invention will now be discussed in connection with Fig. 1. As there shown, a plurality of filters 1, which may be, for example, conventional 30-ton filters, are initially filled with granular percolation adsorbent 2, for example, fuller's earth. Filters 1 are then filled with oil stock of the type to be filtered until adsorbent 2 is completely saturated or "soaked." The amount of oil necessary to so fill each filter is approximately the amount of oil that must be removed from each filter after enough filtration runs so that the spent adsorbent must be replaced with regenerated or new adsorbent. Oil to be filtered is then continuously charged to filters 1 through lines 3, each filter other than the first in the battery of filters receiving filtrate from one or more previous filters, and the oil becoming progressively lighter in color as it passes through the battery of filters. If desired, recycling arrangements are provided so that darker and less refined oil passes first through more nearly "spent" filters, and lighter and more refined oil only passes through new or freshly regenerated filters. After the percolation adsorbent 2 in a given filter 1 is deemed "spent" and thus in need of regeneration, the oil flow to the given filter is terminated. The spent filter adsorbent is then allowed to drain of free oil, which may be recovered. Next, a blast of inert gas is forced through the adsorbent in situ in the given filter 1 to blast additional excess oil from the interstices between the particles of adsorbent 2. The use of an inert gas is preferred to prevent unnecessary oil discoloration by minimizing oxidation of residual oil remaining on the adsorbent. Following the inert gas blasting, the adsorbent 2 in 30-ton filters 1 is washed with a first wash of about 150 barrels of naphtha. This wash is preferably applied cold, i. e., at a temperature at or below the filtration temperature. The reason for this is that the greatest quantities of adsorbed tarry materials are near the top of a filter in which the filtration has taken place from top to bottom. It is therefore usually desirable to cause an initial displacement of retained oil with a naphtha wash applied cold. The cold wash will not dissolve most of the tarry materials and polymerization products, but will leave them in place. Therefore, the oil displaced by the cold wash will not be contaminated with them, and separation from the naphtha wash will thus complete its recovery. The initial naphtha wash is added to the drained filter slowly, as are succeeding naphtha washes, to avoid mixing of the naphtha and the oil in the filter. Additional naphtha beyond that necessary to fill the filter is added at a uniform rate comparable to the filtration rate when oil is being passed through the filter. The slow uniform washing rate for the naphtha avoids excessive channelling of the naphtha, which would reduce the value of the naphtha wash.

Following the initial cold naphtha wash, steam is applied to the adsorbent 2 being treated in situ in a filter 1. The steam is applied for approximately six hours, until the adsorbent 2 has received sufficient heat from the steam that most of the steam passing through the adsorbent no longer condenses thereon, but "breaks through" the adsorbent mass. This initial steam treatment serves to remove the naphtha from the cold naphtha wash and bring the adsorbent temperature up to a level so that the succeeding naphtha washes will be more effective. Succeeding steam treatments will serve additional and novel functions, as will be shown. Following the initial steam treatment, a hot naphtha wash of about 250 barrels is applied to the adsorbent 2 at a naphtha temperature of approximately 300° F. Enough of this hot wash to completely fill the given filter 1 is then retained in the filter for about six hours, during which time the adsorbent 2 soaks in the naphtha, allowing adsorbed tars and other materials to dissolve. At the end of the soaking period the naphtha is drained from the filter 1 and the adsorbent 2 is again steamed in the same manner as previously for about ten hours. Thereafter, the following additional operations are carried out on the adsorbent 2 in place in a filter 1 in the same manner as previous operations:

(1) Third hot naphtha wash with about 250 barrels of naphtha at approximately 300° F., followed by soaking of the adsorbent 2 in this naphtha wash for about six hours.

(2) Third steam treatment of adsorbent 2 for about ten hours, accompanied by the simultaneous pumping through adsorbent 2 of hot naphtha at approximately 300° F. at the rate of about 20 barrels per hour.

(3) Fourth hot naphtha wash with about 250 barrels of naphtha at approximately 300° F., followed by soaking of the adsorbent 2 in this naphtha wash for about six hours.

(4) Final steam treatment for about twelve hours to insure complete removal of naphtha and various materials from adsorbent 2.

It has been found that the foregoing treatment of the adsorbent 2, though requiring more steam, naphtha and time than prior art techniques for adsorbent treating, reduces the hydrocarbon and other impurity content of the spent clay to 2.5 percent or less by weight of clay, in contrast to an average of 7 percent by weight of clay under the conventional prior art methods previously discussed. The foregoing treatment thus makes possible the less damaging and lower regeneration temperatures previously shown to be desirable. Additionally, it has been found that the foregoing treatment has resulted in cutting the oil loss per 30-ton filter from 15 barrels in the prior art methods previously discussed to 5 barrels, and has resulted in making possible a burning clay regeneration without an objectionably odoriferous stack plume. The new treatment method discussed herein does not comprise mere increases in steam, naphtha and time to give changes in degree only over prior art methods, but is based on using both the steam and naphtha to perform new functions in addition to their functions in prior art methods, thus resulting in substantial changes in kind as well as degree over prior art methods. The old washing techniques generally depended solely on naphtha to dissolve oil and resinous bodies. Sufficient naphtha was applied to dissolve and remove all the readily desorbed material from the adsorbent. The adsorbent was then steamed to vaporize and remove residual naphtha from the adsorbent. The efficiency of recovery of the naphtha was the index used for judging filter washing efficiency. In the new methods disclosed herein the naphtha is used as a soaking agent to dissolve and remove material from the adsorbent in addition to material readily desorbed by simple naphtha washing. The steam, which in prior art methods generally had the single function of removing naphtha, has a second and very important function in the methods of this invention. It has been found that steam applied at certain intervals during the absorbent treating operation, and for certain periods of time, will desorb strongly held resins and materials such as sulfonates and sulfates from the adsorbent, in addition to merely removing naphtha as in prior art methods. At one time the goal of adsorbent treating research was to reduce the water content of the adsorbent clay. However, it has been found that the low water content clays resulting from treating operations have a high carbon content, in fact, a carbon content generally bearing an inverse proportion of the water content. From this and other observations it appears that steam, or more probably steam condensate, is an effective desorbent for strongly held resins and materials such as sulfonates and sulfates. After desorption the steam condensate dissolves the sulfonate, thus supplying a carrying medium for the organic salts, which salts and carrying medium are removed mechanically by succeeding naphtha washes. It is possible that the sustained steam applications of the methods of the present invention also improve clay-naphtha contact. A sort of percolation effect may be obtained so that stagnant films of oil-rich naphtha around individual clay particles are disrupted so that oil-lean naphtha can subsequently effect a secondary extraction. In any event, it has been clearly demonstrated that adsorbent clays treated with naphtha washes and applications of steam in accordance with the methods of this invention, while they contain large quantities of steam condensate (20–25 weight percent) in and on the clay, contain 2.5 percent or less oils and tars by weight of clay.

It will be understood that the steps of the preferred washing method outlined above are exemplary only, and that other equivalent steps may be used to reduce the hydrocarbon and other impurity content of the clay to not more than 2.5 percent by weight of clay.

Referring now to Fig. 2, it may be seen that the specific surface area of Florida fuller's earth drops rapidly at reactivation temperatures above 600° F., and thus that it would be extremely desirable to be able to regenerate such an adsorbent at temperatures that are no further above 600° F. than are necessary for satisfactory regeneration. As will be discussed, the methods of this invention permit satisfactory regeneration at temperatures in the range 600° F. to 700° F., and thus permit high specific clay surface areas and correspondingly high clay efficiencies to be maintained.

Still referring to Fig. 2, it may be seen also that the pore volume of Florida's fuller's earth decreases rapidly at reactivation temperatures above 600° F., and thus that it would be extremely desirable for this reason also that the clay reactivation temperatures be held down to 600°–700° F., as is possible with the methods of this invention, to permit higher pore volumes, and consequently higher filtering efficiencies to be maintained.

Referring now to Fig. 3, a typical "Thermofor" kiln is shown, as an aid to understanding the beneficial effects in the regeneration operation that are derivable from the low oil content clays resulting from treating spent clay by the methods of this invention. Although the burning regeneration of the clay may be accomplished in a rotary kiln, a multiple hearth burner, or a "Thermofor" kiln, and the methods of this invention are applicable with any of these devices, the "Thermofor" kiln has certain important advantages over the other devices. The rotary kiln has generally gone out of use in the industry for clay regeneration. The multiple hearth burner is not amenable to positive enough heat and temperature control to be as satisfactory as the "Thermofor" kiln. In the multiple-hearth burner the clay passes downwardly across successive hearth layers against air countercurrent, and water or steam sprayed on the hearths is relied upon for heat and temperature control. Overheating of the clay generally results, with a corresponding decrease in clay life, so that it is necessary to discard clay after considerably fewer burnings than is the case with the "Thermofor" kiln. In the "Thermofor" kiln a controlled flow of a heat transfer medium such as molten salt is passed through vertical heat transfer tubes in a stationary chamber. The clay is passed downwardly between the tubes countercurrent to an air stream being admitted to the bottom of the kiln, and much of the heat necessary to adequately burn the clay results from combustion of the adsorbed organic material on the clay. This organic matter is desirably partially oxidized only, because after partial oxidation the carbonaceous deposit left on the clay is itself an active adsorbent medium. The heavy hydrocarbon molecules present on the clay decompose under heat to form this active carbonaceous deposit. Close temperature and heat control to secure this result is possible by regulating the flow of the molten salt to add heat to the system or remove heat from the system as desired. In more detail, the washed and steamed spent clay from the previously discussed treating operation is removed from the filters and transported to the kiln, where it enters the lower portion 10 of clay feed elevator 11 and follows the pathway indicated by the arrows to clay feed bin 12 of the kiln. Cyclone separator 13 withdraws fine particles from the granular clay as it passes through disengaging chamber 14. The larger particles then pass downwardly around tubes 15, and in so doing, are forced by horizontal inverted angle irons (not shown) stacked between tubes 15 into intimate contact with tubes 15, which contain a circulating flow of molten salt from the coils 16 of salt heater 17. The salt is pumped from heater 17 by salt pump 18 through line 20, tubes 15, and back to salt heater 17 through line 21. At the same time air blower 22 blows air through lines 23 and 24, and upwardly between tubes 15 through holes in the inverted angle irons between tubes 15. The adsorbed materials on the adsorbent clay are thus burned on the angle iron "hearths" in the presence of the heat from the salt-containing pipes 15 and air from air blower 22. The salt temperature and flow through tubes 15 can be varied so that the salt takes heat away from the system or adds heat to the system as necessary to maintain a desired burning temperature for the clay. Under conventional practice the necessary clay burning temperature is very high. Simpson and Payne, in the article "Maintaining decolorizing clays of high efficiencies," in the Oil and Gas Journal for November 17, 1939, give 900° to 1200° F. for the clay burning temperatures and 850°–1500° F. for the temperature of the circulating molten salt. In "Chemical Refining of Petroleum," revised edition, 1942, by Kalichevsky and Stanger, at pages 303 and 304, the authors state that the adsorbents after washing and steaming are roasted at 700°–1400° F., but state that 1020° F. is satisfactory for fuller's earth, and that 1050° F. to 1100° F. is probably a good average. The authors point out that the actual burning temperature must always be determined experimentally, and that the lower temperatures are preferable to preserve the structure of the clay, as discussed in detail above. As previously pointed out, the conventional clay treatment processes result in clay with a high oil content, necessitating the high burning temperatures referred to by Simpson and Payne, and by Kalichevsky and Stanger. However, it has been determined experimentally that the clay treated by the methods of this invention, which has an oil content not exceeding 2.5 percent by weight of the clay, can be very satisfactorily regenerated in the "Thermofor" kiln at temperatures in the range 600° F. to 700° F. The low oil content clay is regenerable with a minimum of difficulty because there is insufficient fuel in the clay to sustain combustion without constant addition of heat from the molten salt heat transfer medium. This enables very accurate control of regeneration temperatures to be maintained, and prevents uncontrolled clay burning, clay overheating, and loss of clay activity. Commercial filter yields indicate a yield increase in the order of 25 percent for clay washed, steamed and regenerated according to the methods of this invention as compared with clay washed, steamed and regenerated with conventional prior art methods. In addition, operations have clearly demonstrated that the low oil content clays resulting from the practice of the methods of this invention produce practically no objectionably odoriferous stack plume when being kiln-regenerated.

Referring now to Fig. 4, it may be seen that the surface area, and hence the adsorbent activity, of the clay particles which are burned at from 600° to 700° F. after having been treated as discussed above, is consistently higher, and is better maintained after repeated regenerations, than clay which must be burned at 1000° F. because of the high oil content remaining after prior art treatment prior to burning.

From the foregoing it may be seen that by the methods of the present invention spent adsorbent clay is treated with inert gas, naphtha and steam in a manner that causes the naphtha and steam to perform heretofore unutilized and unsuspected functions, with the result that filter yields are substantially increased and residual filter oil content is reduced to less than half that obtainable by conventional methods. Further, by the methods of the present invention, clay regeneration is accomplished at substantially lower temperatures than heretofore possible, thus enabling clay structure and activity to be preserved to a much greater degree than formerly, regeneration temperatures to be much more easily controlled, and objectionable odor to be eliminated from stack plumes of regeneration kilns.

Although only specific installations have been discussed in connection with the methods of this invention, and although only one set of preferred temperatures, rates, quantities and times have been set forth as satisfactory for the practice of these methods, these factors may be varied without departing from the spirit of this invention, and all such variations that fall within the scope of the appended claims are intended to be embraced thereby.

I claim:
1. In a process for treating and regenerating spent percolation clays by a process including the steps of solvent washing, steam treating and burning operations, the improvement which comprises further alternately steam treating and solvent washing said clays said steaming being conducted until the steam condensate content of said clays is within the range 20 to 25 percent by weight of clay, and regenerating said clays by conducting said burning operations in a burning regeneration zone at a temperature within the range 600° F. to 700° F.

2. In a process for treating hydrocarbon oils which comprises passing said oils through a percolation type adsorbent until substantial quantities of impurities have been adsorbed from said oils by said adsorbent, and thereafter regenerating the adsorbent, the improvement which comprises draining a substantial portion of the non-adsorbed oil from said adsorbent, forcing a stream of inert gas through said adsorbent to blow additional oil from the interstices of said adsorbent, washing said adsorbent with sufficient cold naphtha to remove additional oil from said adsorbent, steaming said adsorbent to remove said naphtha, further solvent treating and steaming said adsorbent until the adsorbed hydrocarbon and other impurity content of said adsorbent has been reduced at least to two and one-half percent by weight of adsorbent, and until the steam condensate content of said adsorbent is within the range 20–25 percent by weight of said adsorbent, and regenerating said adsorbent by burning at a temperature lying in the range 600° F. to 700° F.

3. In a process for treating spent percolation clays by a process including solvent washing and steam treating said clays until the wash stream is substantially free of visible traces of oil and other impurities, the improvement which comprises further solvent washing and steam treating said clays until the adsorbed hydrocarbon and other impurity content of said clays has been reduced at least to two and one-half percent by weight of clay, and until the steam condensate content of said adsorbent is within the range 20–25 percent by weight of said clays, and thereafter regenerating said clay by burning at a temperature lying in the range 600° F. to 700° F.

References Cited in the file of this patent

UNITED STATES PATENTS

| | | |
|---|---|---|
| 1,709,261 | Hall | Apr. 16, 1929 |
| 1,872,988 | Lederer | Aug. 23, 1932 |
| 2,370,713 | Carlson | Mar. 6, 1945 |
| 2,572,433 | Bergstrom et al. | Oct. 23, 1951 |
| 2,698,305 | Plank et al. | Dec. 28, 1954 |